US008930994B2

(12) United States Patent
Kim (10) Patent No.: US 8,930,994 B2
(45) Date of Patent: Jan. 6, 2015

(54) APPARATUS AND METHOD FOR DISPLAYING DIGITAL BROADCASTING PROGRAM INFORMATION

(75) Inventor: Tae-Hyung Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1926 days.

(21) Appl. No.: 11/110,308

(22) Filed: Apr. 20, 2005

(65) Prior Publication Data

US 2006/0095936 A1    May 4, 2006

(30) Foreign Application Priority Data

Nov. 3, 2004 (KR) .................. 10-2004-0089066

(51) Int. Cl.
| | | |
|---|---|---|
| *H04N 5/445* | (2011.01) | |
| *H04N 7/16* | (2011.01) | |
| *H04N 21/414* | (2011.01) | |
| *H04N 21/431* | (2011.01) | |
| *H04N 21/482* | (2011.01) | |
| *H04N 5/64* | (2006.01) | |

(52) U.S. Cl.
CPC .......... *H04N 5/44543* (2013.01); *H04N 7/163* (2013.01); *H04N 21/41407* (2013.01); *H04N 21/4312* (2013.01); *H04N 21/4314* (2013.01); *H04N 21/482* (2013.01); *H04N 5/64* (2013.01)
USPC .............................................. 725/39; 725/62

(58) Field of Classification Search
USPC .............................................. 725/62, 128, 39
See application file for complete search history.

(56) References Cited

U.S. PATENT DOCUMENTS

| | | | |
|---|---|---|---|
| 6,115,080 A | 9/2000 | Reitmeier | |
| 6,147,714 A | 11/2000 | Terasawa et al. | |
| 6,178,447 B1 * | 1/2001 | Wannenmacher et al. | ... 709/219 |
| 6,452,644 B1 * | 9/2002 | Shimakawa et al. | .......... 348/730 |
| 2002/0049972 A1 * | 4/2002 | Kimoto | ........................ 725/39 |
| 2002/0056102 A1 | 5/2002 | Dillon et al. | |
| 2002/0059621 A1 * | 5/2002 | Thomas et al. | ................. 725/87 |
| 2002/0167503 A1 * | 11/2002 | Tsunoda et al. | ............. 345/204 |
| 2003/0005448 A1 * | 1/2003 | Axelsson et al. | .............. 725/58 |
| 2003/0061609 A1 | 3/2003 | Son | |
| 2003/0237100 A1 * | 12/2003 | Piotrowski | .................. 725/135 |
| 2004/0117843 A1 * | 6/2004 | Karaoguz et al. | ............ 725/108 |
| 2006/0095936 A1 | 5/2006 | Kim | |

FOREIGN PATENT DOCUMENTS

| | | |
|---|---|---|
| CN | 1492678 | 4/2004 |
| JP | 2000-270053 | 9/2000 |
| JP | 2001-142886 | 5/2001 |
| JP | 2001-333157 | 11/2001 |
| JP | 2002-163556 | 6/2002 |

(Continued)

*Primary Examiner* — Nasser Goodarzi
*Assistant Examiner* — Michael Hong
(74) *Attorney, Agent, or Firm* — The Farrell Law Firm, P.C.

(57) ABSTRACT

Disclosed are an apparatus capable of receiving digital broadcasting and displaying program information regarding the digital broadcasting and a method thereof. The apparatus for displaying digital broadcasting program information in a terminal capable of receiving digital broadcasting, includes a digital broadcasting receiving unit for receiving a digital broadcasting program, a memory for storing received broadcasting channel guide information, a control unit for creating program information based on the broadcasting channel guide information stored in the memory and driving the digital broadcasting receiving unit if a broadcasting channel is selected by a user, and a display unit for displaying the program information created by the control unit on a background image in an idle mode.

24 Claims, 6 Drawing Sheets

(56) References Cited

FOREIGN PATENT DOCUMENTS

| | | |
|---|---|---|
| JP | 2002-207555 | 7/2002 |
| JP | 2002-281131 | 9/2002 |
| JP | 2002-320161 | 10/2002 |
| JP | 2004-135177 | 4/2004 |
| JP | 2004-194108 | 7/2004 |
| JP | 2004-229230 | 8/2004 |
| JP | 2004-282638 | 10/2004 |
| JP | 2004-289266 | 10/2004 |
| JP | 2004-304311 | 10/2004 |
| JP | 2004-304428 | 10/2004 |
| KR | 1020030028213 | 4/2003 |
| KR | 1020050044844 | 5/2005 |
| WO | WO 01/56286 | 8/2001 |
| WO | WO 2004/023283 | 3/2004 |

* cited by examiner

APPARATUS AND METHOD FOR DISPLAYING DIGITAL BROADCASTING PROGRAM INFORMATION

PRIORITY

This application claims priority to an application entitled "Apparatus and Method for Displaying Digital Broadcasting Program information" filed in the Korean Intellectual Property Office on Nov. 3, 2004 and assigned Serial No. 2004-89066, the contents of which are incorporated herein by reference.

BACKGROUND OF THE INVENTION

1. Field of the Invention

The present invention relates to a terminal capable of receiving digital broadcasting and displaying program information regarding the digital broadcasting, and a method thereof; and more particularly, to an apparatus and a method for displaying program information on a background image and a method thereof.

2. Description of the Related Art

Electronic program guide (EPG) information is sent from broadcasting centers for a specific period of time and includes information regarding titles and simple keynotes of program broadcasting organized by time and channel. Terminals receive the EPG information and store it in an internal memory or file system, enabling a user to search for the EPG information and to select desired broadcasting.

However, it is very inconvenient for a user to individually search for an EPG menu of each time in order to recognize the EPG information.

SUMMARY OF THE INVENTION

Accordingly, the present invention has been made to solve the above-mentioned problems occurring in the prior art, and an object of the present invention is to provide an apparatus and method that enables receiving and viewing of program information of digital broadcasting in a terminal capable of receiving the digital broadcasting.

Another object of the present invention is to provide an apparatus and method that enables viewing of program information regarding digital broadcasting currently being served without a particular search for the program information.

To accomplish the above objects, there is provided an apparatus for displaying digital broadcasting program information in a terminal capable of receiving digital broadcasting, the apparatus including a digital broadcasting receiving unit for receiving a digital broadcasting program, a memory for storing received broadcasting channel guide information, a control unit for creating program information based on the broadcasting channel guide information stored in the memory and driving the digital broadcasting receiving unit if a broadcasting channel is selected by a user, and a display unit for displaying the program information created by the control unit on a background image in an idle mode.

According to another aspect of the present invention, there is provided a method for displaying digital broadcasting program information in a mobile communication terminal including a display unit and a digital broadcasting receiving unit, the method including storing received broadcasting channel guide information in a memory, creating program information based on the stored electronic channel guide information, displaying the created program information on a background image of the display unit when the mobile communication terminal is in an idle mode, and driving the digital broadcasting receiving unit if channel number selection by a user is detected after the program information is displayed and receiving a digital broadcasting program corresponding to the selected channel number.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described in detail with reference to the accompanying drawings. Note that the same or similar components in drawings are designated by the same reference numerals as far as possible although they are shown in different drawings. Although many specific items, such as detailed channel numbers, detailed program names, etc., are shown in the following description, these are provided for the purpose of overall comprehension about the present invention. Therefore, it is generally known to the skilled in the art that the present invention can be practiced without being limited by the specific embodiments discussed herein. In the following description of the present invention, a detailed description of known functions and configurations incorporated herein will be omitted when it may make the subject matter of the present invention unclear.

Figure 1:
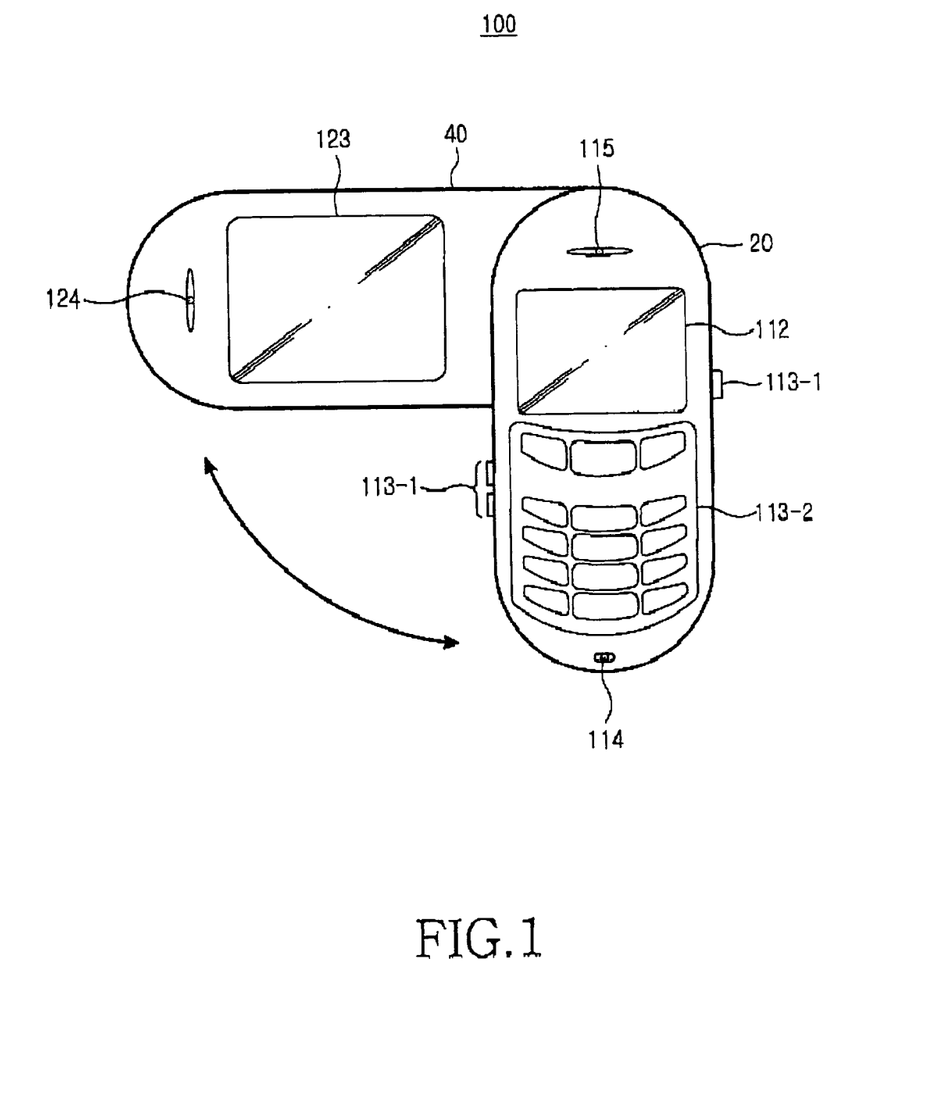
FIG. 1 is a perspective view illustrating a mobile communication terminal capable of receiving DMB according to a preferred embodiment of the present invention.

FIG. 1 is a perspective view illustrating a mobile terminal capable of receiving digital multimedia broadcasting (DMB) according to a preferred embodiment of the present invention. The present invention may employ every terminal capable of receiving digital broadcasting, and it is assumed that the mobile communication terminal shown in FIG. 1 is a portable phone capable of receiving DMB.

A mobile communication terminal 100 according to a preferred embodiment of the present invention includes a main body 20 and a sub-body 40 coupled under the main body 20. The main body 20 includes a first display unit 112, a key input unit 113 having a side key 113-1 and a key pad 113-2, a microphone 114, and a first speaker 115, and is mainly used for performing functions relating to a portable telephone. The sub-body 40 includes a second display part 123 and a second speaker 124 and is mainly used for performing multimedia functions. Herein, although a rotary-type sub-body 40 is illustrated, the sub-body 40 can be made as a folder type. A coupling relationship between the main body 20 and the sub-body 40 does not directly relate to the subject matter of the present invention.

As shown in FIG. 1, when the mobile communication terminal 100 is opened (that is, the main body 20 is not overlapped with the sub-body 40), DMB program information is displayed on a background image of the second display unit 123. If necessary, the first display unit 112 or both the display units 112 and 123 may display DMB program information on their background images. This is determined according to the selection of the user.

When the sub-body 40 is rotated and overlapped with the main body 20 (that is, the user can see only the first display unit 112), the DMB program information is displayed on a text slide area of a background image in the first display unit 112.

Herein, the DMB program information may be displayed in a predetermined area on a background image or as an entire image. According to a preferred embodiment of the present invention, it is assumed that the DMB program information is displayed on a text slide area of a background image.

The mobile communication terminal 100 having the above described structure may perform a portable telephone function or a multimedia function according to operation by a user through the key input unit 113.

In addition, the user can view DMB through the second display unit 123 and confirm original functions of a portable terminal through the first display unit 112. The first display unit 112 and the second display unit 123 may be implemented using liquid crystal displays (LCDs).

Figure 2A:
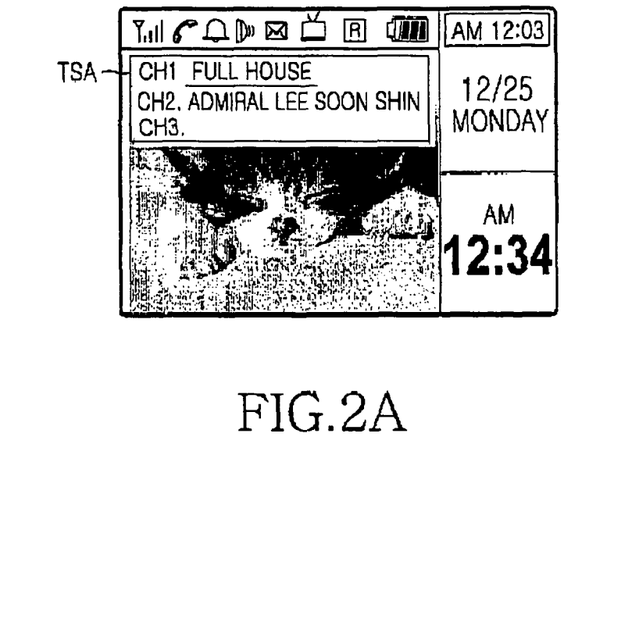
FIGS. 2A and 2B illustrate images having displayed DMB program information according to a preferred embodiment of the present invention.
Figure 2B:
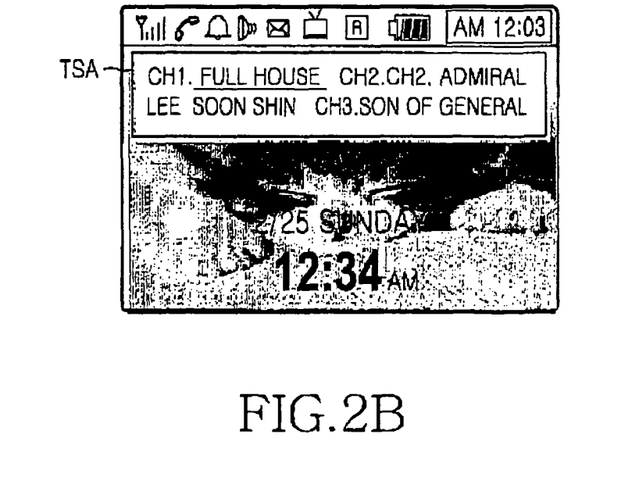

FIGS. 2A and 2B illustrate images on which DMB program information is displayed according to a preferred embodiment of the present invention.

Reference numeral 'TSA' of FIGS. 2A and 2B represents the text slide areas of background images.

Figure 3:
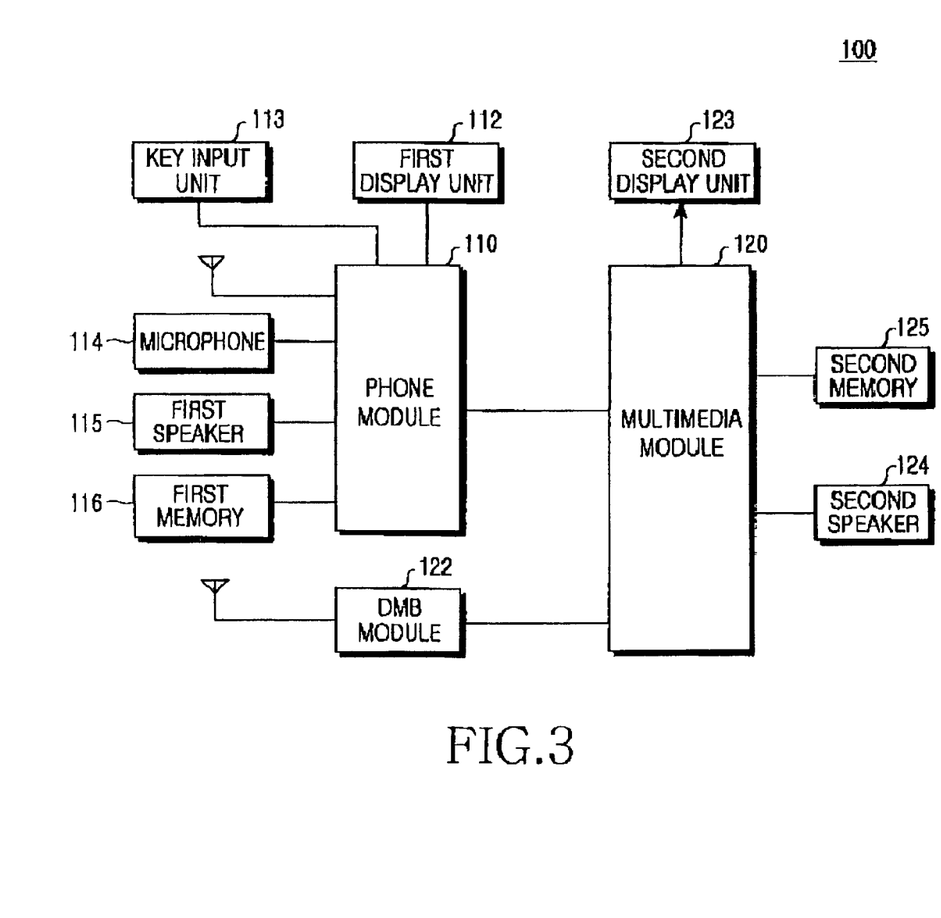
FIG. 3 is a block diagram illustrating a mobile communication terminal capable of receiving digital multimedia broadcasting according to a first embodiment of the present invention.

FIG. 3 is a block diagram illustrating a structure of a mobile communication terminal capable of receiving DMB according to a first embodiment of the present invention.

As shown in FIG. 3, it is assumed that a first module (a phone module 110), a second module (a DMB module 122), and a third module (a multimedia module 120) are separated from each other. However, all or a portion of three modules may be included in one chip (a control unit).

The mobile communication terminal 100 according to a preferred embodiment of the present invention may include a portable telephone capable of receiving DMB. The mobile communication terminal 100 may include the portable telephone function module (called a phone module) 110 for controlling a portable telephone function, the DMB module 122 for performing a broadcasting service receiving function, and the multimedia module 120 for controlling a multimedia function. The phone module 110 controls the first display unit 112, the key input unit 113, the microphone 114, the first speaker 115, and a first memory 116. The multimedia module 120 controls the second display unit 123, the second speaker 124, and a second memory 125.

The phone module 110 may be realized using radio frequency (RF) transmit/receive units and a modem chip (e.g., a QualComm MSM 5500 modem chip). The phone module 110 transmits/receives signals relating to communication and controls overall mobile communication terminal functions including portable telephone functions. The first display unit 112 displays information regarding the overall mobile communication terminal functions including the portable telephone functions and displays DMB program information on a text slide area of a background image.

The key input unit 113 receives data or a control command according to operation by a user. The microphone 114 receives audio signals. The first speaker 115 outputs audio signals (e.g., voice in communication) relating to the portable telephone functions. The first memory 116 stores information regarding the overall mobile communication terminal functions including the portable telephone functions.

The DMB module 122 is a module for receiving digital broadcasting and includes a unit for receiving a DMB RF signal through an antenna and a demodulator, which are not shown in the drawings because the subject matter according to the present invention is not concerned with such a detailed construction.

The multimedia module 120 decodes DMB data sent from the DMB module 122 into multimedia information (image, letters, and audio), and outputs the multimedia information to a user. The second display unit 123 displays an image signal output from the multimedia module 120. In addition, the second display unit 123 displays DMB program information on a text slide area of a background image. The second speaker 124 outputs an audio signal output from the multimedia module 120. The second memory 125 stores information (e.g., program information) regarding a DMB service.

The multimedia module 120 can determine a display unit for displaying DMB program information according to a folder state. In other words, if the folder is closed, the multimedia module 120 allows the first display unit 112 to display the DMB program information. If the folder is opened, the multimedia module 120 controls the second display unit 112 or both the display units 112 and 123 to display program information.

The first speaker 115, the second speaker 124, the first display unit 112, and the second display unit 123 may be constructed either as separate hardware or one integrated speaker and one integrated display unit. In addition, the multimedia module 120 may be realized using the H.264 CODEC multimedia processor.

Figure 4:
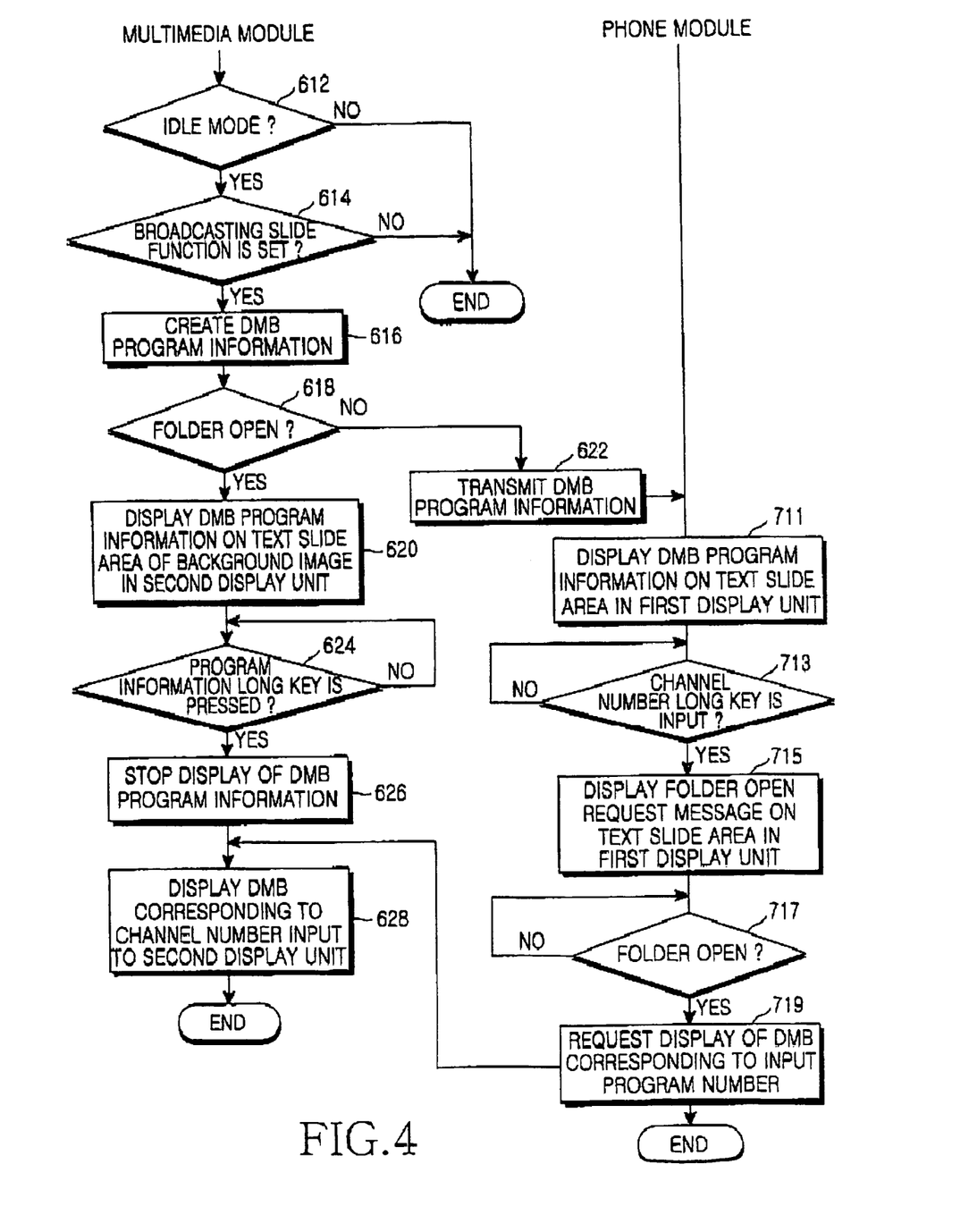
FIG. 4 is a ladder diagram illustrating a method for displaying DMB program information in the mobile communication terminal of FIG. 3.

FIG. 4 is a ladder diagram illustrating a method for displaying DMB program information by the mobile communication terminal shown in FIG. 3.

If the multimedia module 120 detects an idle mode in step 612, the multimedia module 120 determines if a broadcasting slide function is set in step 614. If the broadcasting slide function is set, the multimedia module 120 creates DMB program information based on EPG information stored in the second memory 125 in step 616. Then, the multimedia module 120 determines if the mobile communication terminal folder is opened in step 618.

If the phone is not in an idle mode in step 612, or the broadcasting slide function is not set in step 614, the process ends.

If the folder is opened, the multimedia module 120 controls the second display unit 123 to display the DMB program information on a text slide area of a background image in step 620 as shown in FIGS. 2A and 2B. At this time, a user can select a channel based on the DMB program information. Herein, the user can use a long key in order to select the channel. In other words, when the broadcasting slide function is set and a user presses a predetermined numeral key for a long time, the program of a corresponding DMB channel is displayed.

In step 624, the multimedia module 120 waits for a channel number long key press. Once pressed, the multimedia module 120 allows the second display unit 123 to stop displaying the DMB program information in step 626. In step 628, the DMB module is operated, receives a broadcasting program corresponding to the input channel number, and displays the broadcasting on the second display unit 123 through the multimedia module 120.

If the folder is not opened in step 618, the multimedia module 120 transmits DMB program information to the phone module 110 in step 622. After receiving the DMB program information, the phone module 110 controls the first display unit 112 to display the DMB program information on a text slide area of a background image in step 711. Thereafter, the phone module 110 waits for a channel number long key press in step 713. If the long key is pressed, the phone module 110 controls the first display unit 112 to display a folder open request message on the text slide area of the background image in step 715. If the user opens the folder based on the folder open request message, the phone module 110 detects the open of the folder and requests the multimedia module 120 to display DMB corresponding to an input channel number in step 719. The multimedia module 120 having received the request controls the second display unit 123 to display DMB corresponding to the input channel number in step 628.

Figure 5:
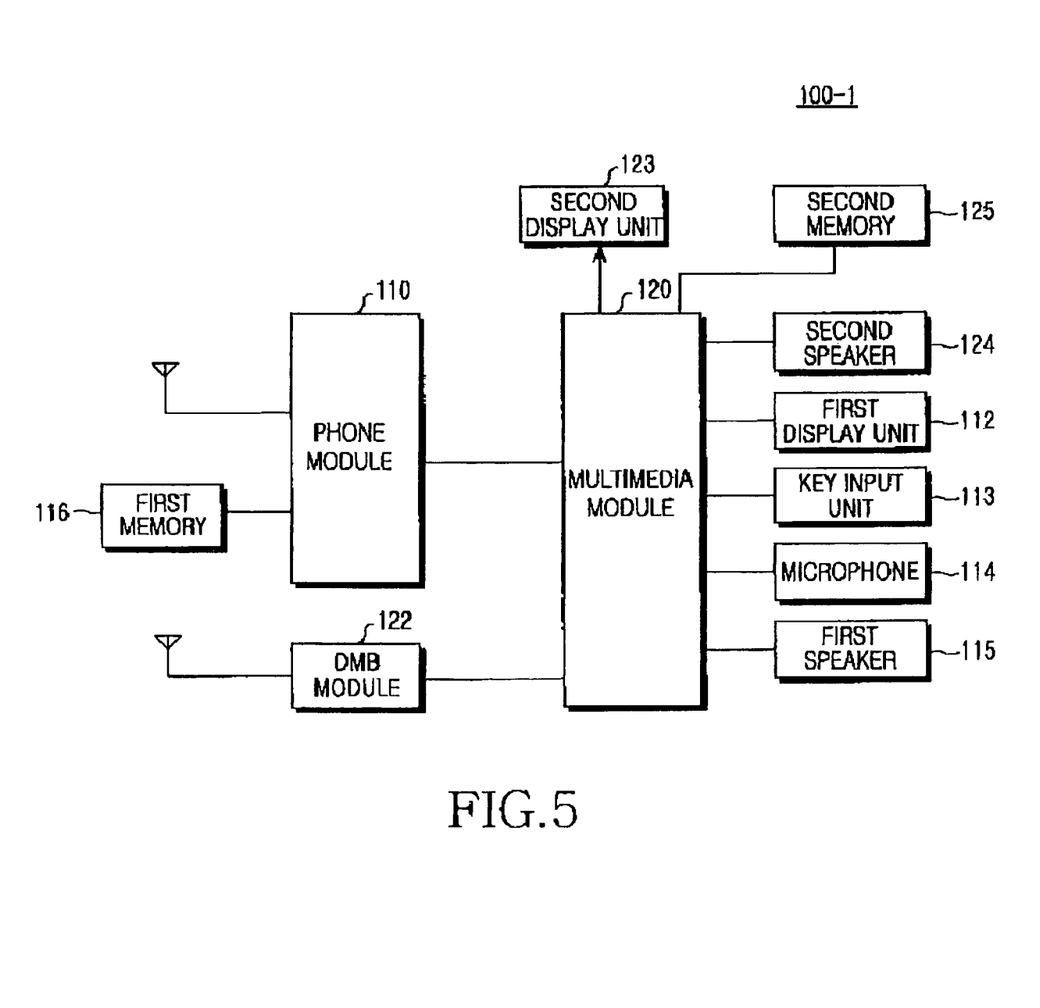
FIG. 5 is a block diagram illustrating a mobile communication terminal capable of receiving DMB according to a second embodiment of the present invention.

FIG. 5 is a block diagram illustrating a mobile communication terminal 100-1 capable of receiving DMB according to a second embodiment of the present invention.

The mobile communication terminal 100-1 includes a personal data assistant ("PDA") capable of receiving digital multimedia broadcasting. In a comparison of components in FIGS. 3 and 5, the components under the control of the phone module 110 in FIG. 3, except for the first memory 116, are controlled by the multimedia module 120 in FIG. 5 instead. This embodiment is based on the intrinsic structure of a PDA. Operation of each component shown in FIG. 5 is like that of its corresponding component in FIG. 3, except for the basic functions of the PDA. Accordingly, a detailed description about each component will be omitted and the same reference numerals will be employed.

Figure 6:
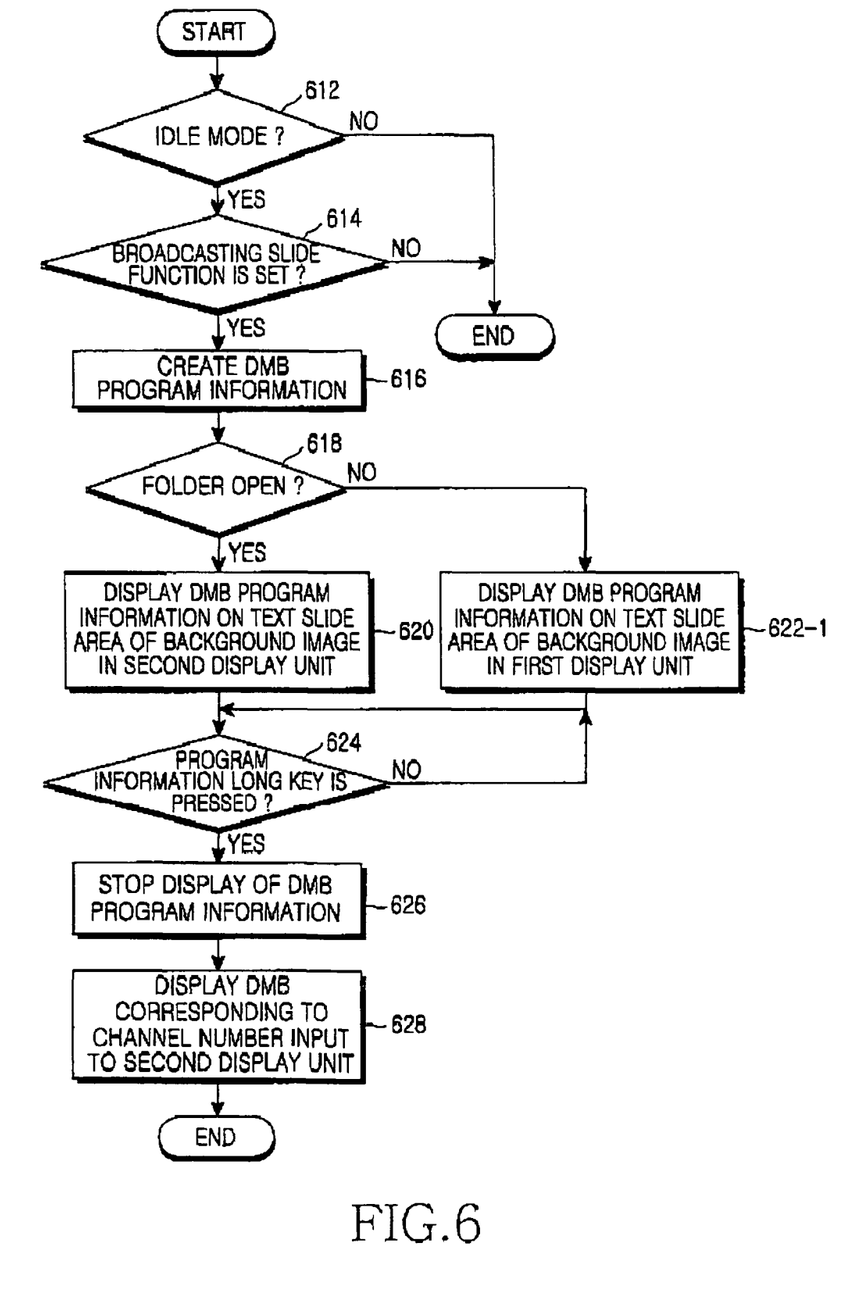
FIG. 6 is a ladder diagram illustrating a method for displaying DMB program information by the mobile communication terminal of FIG. 5.

FIG. 6 is a ladder diagram illustrating a method for displaying DMB program information by the mobile communication terminal 100-1 shown in FIG. 5.

If the multimedia module 120 detects an idle mode in step 612, the multimedia module 120 determines if a broadcasting slide function is set in step 614. If the broadcasting slide function is set, the multimedia module 120 creates DMB program information based on EPG information stored in the second memory 125 in step 616. The DMB program information may be set in such a manner that the DMB program information satisfies a predetermined criterion (condition).

If, however, the terminal is not in an idle mode in step 612, or the broadcasting slide function is not set in step 614, the process ends.

Herein, the predetermined criterion may be set by a user or based on time or channels. In further detail, the DMB program information may be made based on EPG information regarding broadcasting channels in overall time or current time. The multimedia module 120 determines if a folder of the mobile communication system 100-1 is opened in step 618.

If the folder of the mobile communication system 100-1 is opened, the multimedia module 120 controls the second display unit 123 to display DMB program information on a text slide area of a background image in step 620. If the folder is not opened, the multimedia module 120 controls the first display unit 112 to display DMB program information on a text slide area of a background image in step 622-1 as shown in FIGS. 2A and 2B. A user can select a channel based on the DMB program information. Herein, the user can use a long key in order to select the channel.

The multimedia module 120 waits for the long key in step 624. If the multimedia module 120 detects that the long key is pressed, the multimedia module 120 stops the display of the DMB program information in step 626. In step 628, the DMB module 122 is operated, receives a broadcasting program corresponding to the input channel number, and displays the broadcasting program on the second display unit 123 through the multimedia module 120.

Step 626 may be performed or not as needed. For example, when the folder is not opened in step 618, it is unnecessary to stop displaying DMB program information because the DMB program information is displayed on the first display unit 112. Although not shown, when the folder is opened in step 618, two display units 112 and 123 may be realized in such a manner that both the units 112 and 123 display DMB program information. In this case, it is unnecessary to stop the display of DMB program information by the first display unit 112.

The long key for the channel number is valid for a broadcasting slide function. In other words, when a predetermined numeral key is pressed for a long time in the broadcasting slide function, the program of a corresponding DMB channel is displayed.

Although not shown in FIG. 3 or FIG. 5 in detail, the second memory 125 may be realized using nano-flash memories and SDRAMs. The received EFG information is stored in the nano-flash memories and is copied into the SDRAMs when an operation relating to the EFG information (e.g., program information is created) is performed.

As shown in FIG. 3, when the phone module 110 and the multimedia module 120 have the first display unit 112 and the second display unit 123, respectively, the multimedia module 120 transfers EFG program information to the phone module 110 by using dual port RAMs (DPRAMs) or arm internal memories (AIMs) (not shown) such that the program information can be displayed through the first display unit 112 controlled by the phone module 110.

Although DMB program information relates to overall channels in step 616 of FIG. 4, the multimedia module 120 may create only corresponding DMB program information by reading out only EPG information corresponding to registered channels from the second memory unit 125 when concerned channels are previously registered in spaces for the concerned channels of the mobile communication terminal. In this case, necessity for showing needless DMB program information by a user is obviated, improving user satisfaction.

As described above, the mobile communication terminal may be constructed using only one display unit or one body. In this case, it is well known to those skilled in the art that a folder state determining step of step 618 or the step of selecting a display unit for displaying the DMB program information is unnecessary.

In addition, mobile communication terminals may be constructed in such a manner that their control units control MP3 player functions, digital video disc player functions, or telematics functions according to types of the mobile communication terminals.

As described above, according to the present invention, although a user does not view digital broadcasting, a broadcasting slide area is set on a background image of the terminal so that the user may show current broadcasting program information While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments discussed herein, but should be defined by the appended claims and equivalents thereof.

What is claimed is:

1. A method for displaying digital broadcasting program guide information in a mobile communication terminal, said terminal including a display unit, a digital broadcasting receiving unit and a memory, the method comprising the steps of:
   receiving the broadcasting program guide information through the digital broadcasting receiving unit;
   storing the received broadcasting program guide information in the memory;
   determining whether an idle mode is set and an image is displayed on the display unit while a user is not viewing digital broadcasting; and
   automatically displaying the broadcasting program guide information on the display unit, if it is determined that the idle mode is set and the image is displayed on the display unit while the user is not viewing digital broadcasting.

2. The method of claim 1, further comprising:
   customizing the received broadcasting program guide information; and
   displaying the customized broadcasting program guide information on the display unit.

3. The method of claim 1, further comprising the step of:
   selecting a channel of the digital broadcasting program guide information by pressing a key for a time period.

4. The method of claim 2, wherein displaying the customized broadcasting program guide information further comprises displaying the customized broadcasting program guide information on the display unit in an idle mode of the mobile communication terminal.

5. The method of claim 2, wherein displaying the customized broadcasting program guide information further comprises displaying the customized broadcasting program guide information on the display unit in a digital broadcasting mode of the mobile communication terminal.

6. The method of claim 2, wherein the broadcasting program guide information is customized based on a criterion.

7. The method of claim 2, wherein the digital broadcasting receiving unit is inactive while displaying the customized broadcasting program guide information from the memory.

8. The method of claim 6, wherein the criterion is set by a user.

9. A method for displaying digital broadcasting program guide information in a mobile communication terminal, said terminal including a display unit, a digital broadcasting receiving unit and a memory, the method comprising the steps of:
   receiving the broadcasting program guide information through the digital broadcasting receiving unit;
   storing the received broadcasting program guide information in the memory;
   determining whether an idle mode is set and an image is displayed on the display unit while a user is not viewing digital broadcasting;
   automatically displaying the broadcasting program guide information on the display unit, if it is determined that the idle mode is set and the image is displayed on the display unit while the user is not viewing digital broadcasting; and
   activating the digital broadcasting receiving unit when a user selects a broadcasting program from the displayed broadcasting program guide information.

10. The method of claim 9, further comprising:
    customizing the received broadcasting program guide information; and
    displaying the customized broadcasting program guide information on the display unit.

11. The method of claim 9, further comprising:
    selecting a channel of the digital broadcasting program guide information by pressing a key for a time period.

12. The method of claim 10, wherein displaying the customized broadcasting program guide information further comprises displaying the customized broadcasting program guide information on the display unit in an idle mode of the mobile communication terminal.

13. The method of claim 10, wherein displaying the customized broadcasting program guide information further comprises displaying the customized broadcasting program guide information on the display unit in a digital broadcasting mode of the mobile communication terminal.

14. The method of claim 10, wherein the broadcasting program guide information is customized based on a criterion.

15. The method of claim 10, wherein the digital broadcasting receiving unit is inactive while displaying the customized broadcasting program guide information from the memory.

16. The method of claim 14, wherein the criterion is set by the user.

17. An apparatus for displaying digital broadcasting guide program information in a pocket-sized mobile communication device, the apparatus comprising:
    a digital broadcasting receiving unit for receiving the broadcasting program guide information;
    a memory for storing received the broadcasting program guide information;
    a display unit for automatically displaying the broadcasting program guide information on a background image when an idle mode is set and an image is displayed on the display unit while a user is not viewing digital broadcasting; and
    a control unit for activating the digital broadcasting receiving unit when a user selects a broadcasting program from the broadcasting program guide information.

18. The apparatus of claim 17, wherein the control unit allows the user to customize the received broadcasting program guide information and display the customized broadcasting program guide information on the display unit.

19. The apparatus of claim 17, wherein the digital broadcasting receiving unit is inactive while displaying the customized broadcasting program guide information from the memory.

20. The apparatus of claim 17, wherein a channel of the digital broadcasting program guide information is selected by pressing a key for a time period.

21. The apparatus of claim 17, wherein the control unit allows the user to select the customized broadcasting program guide information as a background image of the pocket-sized mobile communication device.

22. The apparatus of claim 18, wherein the display unit displays the customized broadcasting program guide information in a digital broadcasting mode of the mobile communication device.

23. The apparatus of claim 18, wherein the broadcasting program guide information is customized based on a criterion.

24. The apparatus of claim 23, wherein the criterion is set by the user.

* * * * *